US012546153B2

(12) United States Patent
McMahan et al.

(10) Patent No.: US 12,546,153 B2
(45) Date of Patent: Feb. 10, 2026

(54) NACELLE PIN LATCH ASSEMBLY

(71) Applicant: Rohr, Inc., Chula Vista, CA (US)

(72) Inventors: Paul F. McMahan, College Station, TX (US); Braskel Phillips, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 111 days.

(21) Appl. No.: 18/372,474

(22) Filed: Sep. 25, 2023

(65) Prior Publication Data

US 2025/0101779 A1 Mar. 27, 2025

(51) Int. Cl.
*E05C 1/06* (2006.01)
*B64D 29/06* (2006.01)

(52) U.S. Cl.
CPC ................ *E05C 1/06* (2013.01); *B64D 29/06* (2013.01)

(58) Field of Classification Search
CPC ............. Y10T 292/216; Y10T 292/102; Y10S 292/49; B64D 29/06; E05C 1/06; E05C 1/04; E05C 1/065; E05C 1/10; E05C 1/12; E05C 1/14; E05C 1/145; E05C 19/14; E05C 19/145; E05B 15/0086; E05B 65/0817
See application file for complete search history.

(56) References Cited

U.S. PATENT DOCUMENTS

| | | | | |
|---|---|---|---|---|
| 4,099,751 | A | 7/1978 | Poe | |
| 5,984,382 | A * | 11/1999 | Bourne | E05C 19/145 292/DIG. 31 |
| 6,343,815 | B1 * | 2/2002 | Poe | E05C 19/145 292/DIG. 31 |
| 11,408,210 | B2 | 8/2022 | Collins | |
| 2012/0235425 | A1 | 9/2012 | Do | |
| 2013/0140832 | A1 | 6/2013 | Do | |
| 2019/0218837 | A1 * | 7/2019 | Collins | B64D 29/06 |

FOREIGN PATENT DOCUMENTS

| | | | | |
|---|---|---|---|---|
| EP | 2431555 | A1 * | 3/2012 | E05B 13/002 |
| EP | 2431555 | B1 | 11/2014 | |
| FR | 2646683 | A1 * | 11/1990 | E05C 1/065 |

OTHER PUBLICATIONS

EP Search Report for EP Patent Application No. 24202525.2 dated Feb. 18, 2025.

* cited by examiner

*Primary Examiner* — Christine M Mills
*Assistant Examiner* — Yahya Sidky
(74) *Attorney, Agent, or Firm* — Getz Balich LLC

(57) ABSTRACT

A latch assembly is provided that includes first and second lateral side panels, a handle, a latch pin linkage, and a latch pin guide block. The first and second lateral side panels extend lengthwise between proximal and distal ends of the latch assembly. The handle is pivotally attached for rotation about a handle pivot axle between handle closed and handle fully open configurations. The latch pin linkage includes a drive link, a drag link, and a latch pin. The drive link is configured to stop rotation of the latch pin linkage in opposing first and second rotational directions. The drag link is pivotally attached to the drive link and the latch pin. The latch pin guide block is disposed between the first and second lateral side panels at the proximal end of the latch assembly. The latch pin guide block has an inner bore configured to receive the latch pin.

19 Claims, 5 Drawing Sheets

NACELLE PIN LATCH ASSEMBLY

BACKGROUND OF THE INVENTION

1. Technical Field

The present disclosure relates to nacelle latch assemblies in general, and to nacelle latch assemblies that include a latch pin in particular.

2. Background Information

Modern aircraft propulsion systems typically include a gas turbine engine and a nacelle housing providing an aerodynamic covering for the gas turbine engine. The nacelle may include one or more cowls for covering components of the gas turbine engine. These cowls may be pivotally mounted to a stationary structure enabling those cowls to be opened for providing access to the components underneath. The cowls may be secured in a closed position using one or more latch assemblies. Various types of latch assemblies are known in the art. While these known latch assemblies have various benefits, they are typically difficult to open easily and are very often utilize complex mechanical structures that are prone to damage. Accordingly, a latch assembly that overcomes the shortcomings of existing latch assemblies is desired.

SUMMARY

According to an aspect of the present disclosure, a latch assembly is provided that includes a first lateral side panel, a second lateral side panel, a handle, a latch pin linkage, a latch pin guide block, and a handle biasing element. The first and second lateral side panels extend lengthwise between a proximal end of the latch assembly and a distal end of the latch assembly. The handle is pivotally attached to the first and second lateral side panels for rotation about a handle pivot axle. The handle includes a first drive link post aperture and a second drive link post aperture. The first and second drive link post apertures are aligned with one another. The latch pin linkage includes a drive link, a drag link, and a latch pin. The drive link has a central body with first and second lengthwise sides opposite one another, and first and second lateral sides opposite one another. The first and second lengthwise sides are orthogonal to the first and second lateral sides. The drive link includes a drag link clevis extending out from the first lengthwise side of the central body and a pivot axle clevis extending out from the second lengthwise side of the central body. The pivot axle clevis is rotatably connected to the handle pivot axle. A first drive link post extends out from the central body first lateral side and a second drive link post extending out from the central body second lateral side. The first drive link post is received within the first drive link post aperture and the second drive link post is received within the second drive link post aperture. The drag link (DL) has a DL proximal end and a DL distal end. The DL distal end is pivotally attached to the drag link clevis and the DL proximal end is pivotally attached to the latch pin. The latch pin guide block is disposed between the first and second lateral side panels at the proximal end of the latch assembly. The latch pin guide block has an inner bore configured to receive the latch pin. The handle biasing element is configured to bias the handle to rotate about the handle pivot axis away from the first and second lateral side panels.

In any of the aspects or embodiments described above and herein, the latch assembly may be configured for the handle to rotate between a handle closed configuration and a handle fully open configuration, and the drive link may be configured to stop rotation of the latch pin linkage in a first rotational direction beyond the handle closed configuration and to stop rotation of the latch pin linkage in a second rotational direction beyond the handle fully open configuration, wherein the first rotational direction is opposite the second rotational direction.

In any of the aspects or embodiments described above and herein, the drive link may include an over-center pin engaged with the drag link clevis and the over-center pin may be disposed to contact the drag link to stop the rotation of the latch pin linkage in the first rotational direction beyond the handle closed configuration.

In any of the aspects or embodiments described above and herein, the drive link may be configured to contact the drag link to stop the rotation of the latch pin linkage in the second rotational direction beyond the handle fully open configuration.

In any of the aspects or embodiments described above and herein, the handle may include a topside panel, a first handle lateral side panel, and a second handle lateral side panel. The first and second handle lateral side panels extend outwardly from the topside panel such that the first handle lateral side panel, the second handle lateral side panel, and the topside panel collectively forming a U-shape. The first drive link post aperture may be disposed in the first handle lateral side panel, and the second drive link post aperture may be disposed in the second handle lateral side panel.

In any of the aspects or embodiments described above and herein, the first drive link post aperture may be configured as a first drive link post slot, and the second drive link post aperture may be configured as a second drive link post slot. The first and second drive link post slots may each have a slot length that is greater than a slot width, and the slot length extends between a slot first end and a slot second end.

In any of the aspects or embodiments described above and herein, each slot length may extend along a straight line.

In any of the aspects or embodiments described above and herein, the latch assembly may be configured to rotate between a handle closed configuration and a plurality of handle open configurations. In the handle closed configuration, the first drive link post may be disposed at the first slot end of the first drive link post slot, and the second drive link may be disposed at the first slot end of the second drive link post slot. In the plurality of handle open configurations, the first drive link post may be disposed at the second slot end of the first drive link post slot, and the second drive link post may be disposed at the second slot end of the second drive link post slot.

In any of the aspects or embodiments described above and herein, the latch pin guide block may include a pair of attachment flanges, and the latch assembly further may include a proximal end pin that is engaged with the first and second lateral side panels, and the proximal end pin may extend through the attachment flanges.

In any of the aspects or embodiments described above and herein, the latch pin guide block attachment flanges and the first and second lateral side panels may include aligned fastener apertures that are configured to receive a latch assembly mounting fastener. The fastener apertures are disposed between the distal end of the latch assembly and the proximal end pin.

In any of the aspects or embodiments described above and herein, the handle biasing element may be configured to act against the handle and to act against the drive link.

In any of the aspects or embodiments described above and herein, the handle biasing element may be a torsional spring.

In any of the aspects or embodiments described above and herein, the handle may include a handle latch mechanism that is configured to bias the handle latch mechanism in a latched orientation.

According to an aspect of the present disclosure, a latch assembly is provided that includes first and second lateral side panels, a handle, a latch pin linkage, and a latch pin guide block. The first and second lateral side panels extend lengthwise between a proximal end of the latch assembly and a distal end of the latch assembly. The handle is pivotally attached to the first and second lateral side panels for rotation about a handle pivot axle. The handle is rotatable between a handle closed configuration and a handle fully open configuration. The latch pin linkage includes a drive link, a drag link, and a latch pin. The drive link is configured to stop rotation of the latch pin linkage in a first rotational direction beyond the handle closed configuration and to stop rotation of the latch pin linkage in a second rotational direction beyond the handle fully open configuration. The first and second rotational directions are opposite one another. The drag link is pivotally attached to the drive link and the latch pin. The latch pin guide block is disposed between the first and second lateral side panels at the proximal end of the latch assembly. The latch pin guide block has an inner bore configured to receive the latch pin.

In any of the aspects or embodiments described above and herein, the latch assembly may include a handle biasing element configured to bias the handle to rotate about the handle pivot axis away from the first and second lateral side panels.

In any of the aspects or embodiments described above and herein, the drive link may include a central body with opposing first and second lengthwise sides, and opposing first and second lateral sides, and the first and second lengthwise sides may be orthogonal to the first and second lateral sides. The drag link clevis may extend out from the first lengthwise side of the central body. The pivot axle clevis may extend out from the second lengthwise side of the central body. The pivot axle clevis may be rotatably connected to the handle pivot axle.

In any of the aspects or embodiments described above and herein, the handle may include first and second drive link post apertures aligned with one another. The drive link may include a first drive link post extending out from the central body first lateral side, and a second drive link post extending out from the central body second lateral side. The first drive link post may be received within the first drive link post aperture and the second drive link post may be received within the second drive link post aperture.

In any of the aspects or embodiments described above and herein, the first drive link post aperture may be configured as a first drive link post slot, and the second drive link post aperture may be configured as a second drive link post slot. The first and second drive link post slots may each have a slot length that is greater than a slot width, and the slot length extends between a slot first end and a slot second end.

In any of the aspects or embodiments described above and herein, each slot length may extend along a straight line.

In any of the aspects or embodiments described above and herein, in the handle closed configuration the first drive link post may be disposed at the first slot end of the first drive link post slot, and the second drive link post may be disposed at the first slot end of the second drive link post slot. In the plurality of handle open configurations, the first drive link post may be disposed at the second slot end of the first drive link post slot, and the second drive link post may be disposed at the second slot end of the second drive link post slot.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
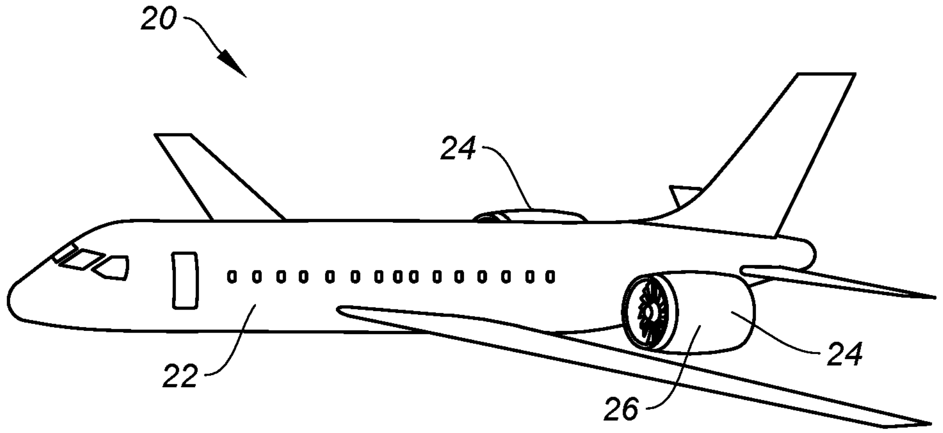
FIG. 1 diagrammatically illustrates a conventional fixed wing aircraft that may utilize embodiments of the present disclosure.

FIG. 1 illustrates a conventional fixed wing aircraft 20 that may utilize embodiments of the present disclosure. The aircraft 20 includes a fuselage 22 and a pair of nacelles 24. Each nacelle 24 includes a fan cowl 26 configured to permit selective access to at least a portion of the interior of the nacelle 24. Each nacelle 25 includes at least one present disclosure latch assembly 28.

Figure 2:
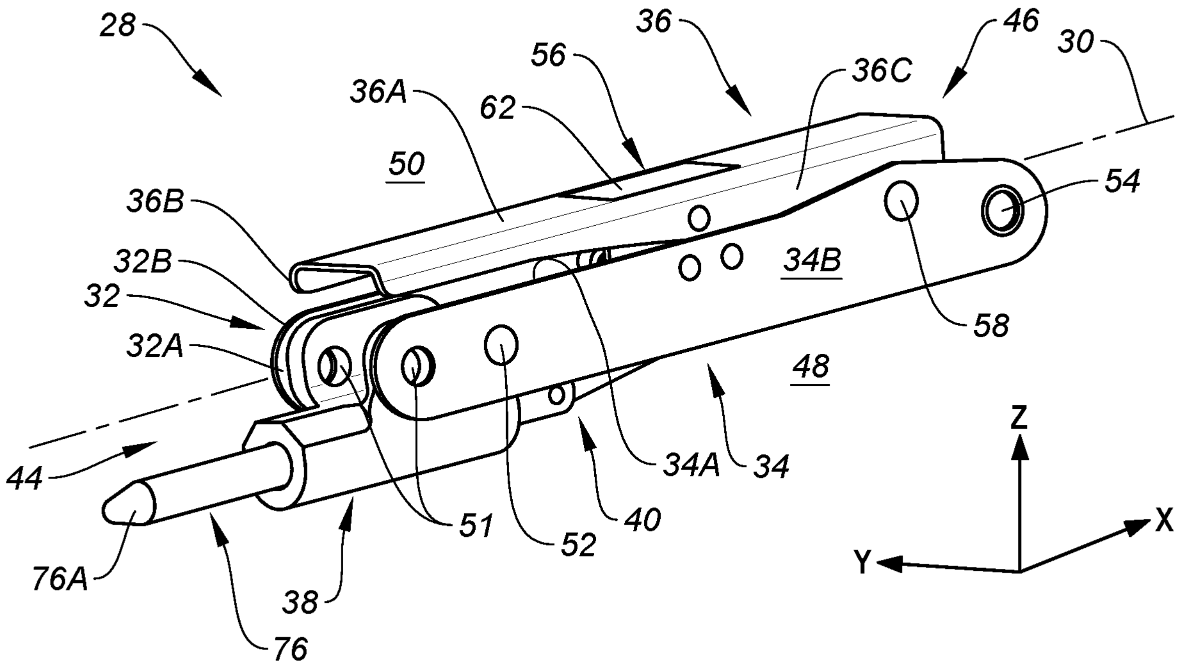
FIG. 2 is a diagrammatic perspective view of a present disclosure latch assembly embodiment shown in a handle closed configuration.
Figure 3:
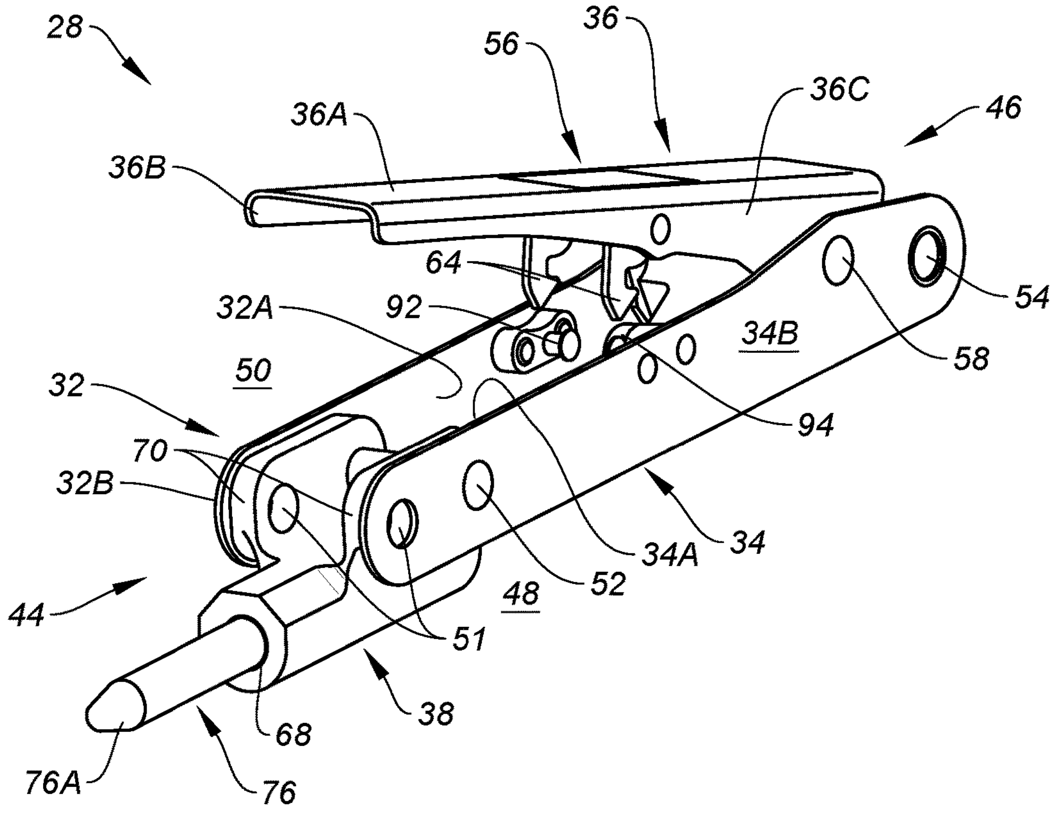
FIG. 3 is a diagrammatic perspective view of a present disclosure latch assembly embodiment shown in a handle open configuration.

FIGS. 2 and 3 illustrate an example of a present disclosure latch assembly 28. The latch assembly 28 may be described as extending along a central axis 30. The latch assembly 28 includes a first lateral side panel 32, a second lateral side panel 34, a handle 36, a latch pin guide block 38, a latch pin linkage 40 (e.g., see FIG. 4), and a handle biasing element 42 (e.g., see FIG. 4). The latch assembly 28 extends lengthwise along the central axis 30 between a proximal end 44 and a distal end 46, widthwise between the first and second lateral side panels 32, 34, and height wise between a bottom side 48 and a handle side 50. To facilitate the description herein, orthogonal axes X, Y, and Z are shown in FIG. 2. The latch assembly 28 length extends in the X-axis direction. The latch assembly 28 width extends in the Y-axis direction.

The latch assembly 28 height extends in the Z-axis direction. The terms “proximal” and “distal” are used herein solely to facilitate the description and are not intended to imply any latch assembly 28 orientation. FIG. 2 is a perspective view of the latch assembly 28 in a handle closed configuration. FIG. 3 is a perspective view of the latch assembly 28 in a handle open configuration. As will be detailed herein, the handle 36 is pivotal and the latch assembly 28 may be disposed in a plurality of handle open configurations as shown in FIGS. 7B-7D, including the handle fully open configuration shown in FIG. 7D. FIGS. 4, 6, and 7A-7D diagrammatically illustrate the latch assembly 28 with the second lateral side panel 34 removed to facilitate description of latch assembly 28 components.

Referring to FIGS. 2 and 3, the first lateral side panel 32 extends lengthwise between a proximal end and a distal end and includes an inner surface 32A and an outer surface 32B. The second lateral side panel 34 extends lengthwise between a proximal end and a distal end and includes an inner surface 34A and an outer surface 34B. In the embodiment shown in FIGS. 2 and 3, the first and second lateral side panels 32, 34 are uniformly spaced apart from one another along their lengths, and are therefore parallel one another. In this embodiment, a proximal end pin 52 extends between the first and second lateral side panels 32, 34 adjacent the proximal end 44 of the latch assembly 28, and a distal end pin 54 extends between the first and second lateral side panels 32, 34 adjacent the distal end 46 of the latch assembly 28, thereby connecting the first and second lateral side panels 32, 34 to one another. The first and second lateral side panels 32, 34 include apertures 51 to receive a fastener configured to mount the latch assembly 28.

Figure 4:
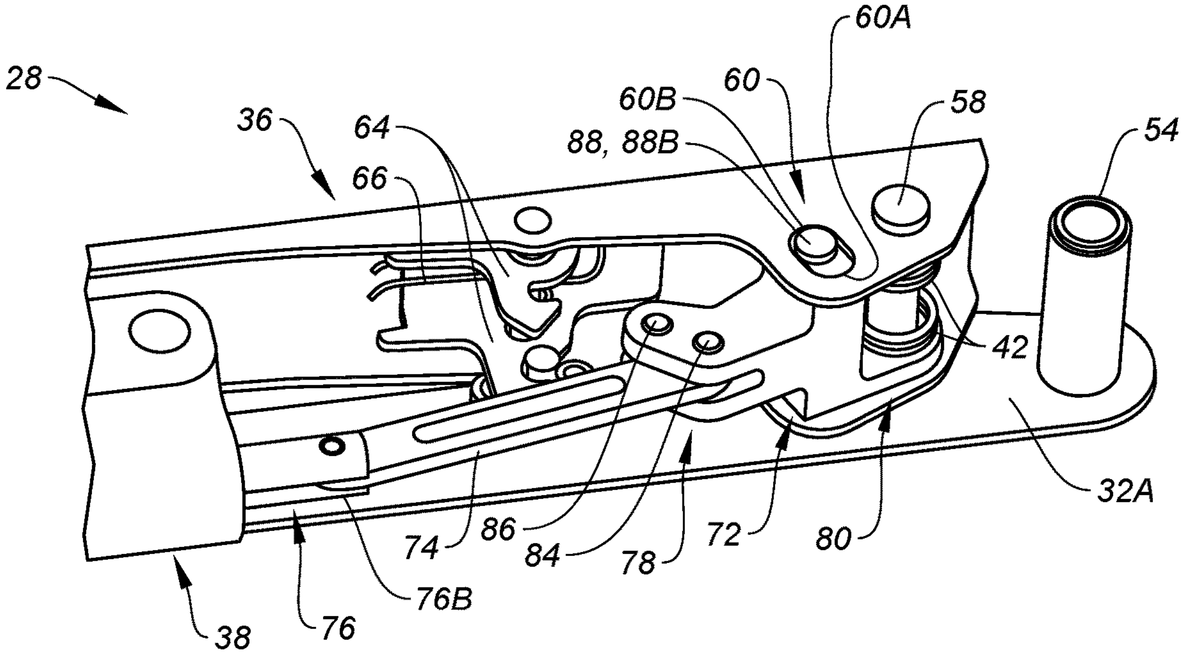
FIG. 4 is a diagrammatic perspective partial view of a present disclosure latch assembly embodiment shown in a handle closed configuration.

Referring to FIGS. 2-4, the handle 36 includes a topside panel 36A, a first handle lateral side panel 36B, a second handle lateral side panel 36C, and a handle latch mechanism 56. The first handle lateral side panel 36B is disposed on a first lateral side of the topside panel 36A and the second handle lateral side panel 36C is disposed on a second lateral side of the topside panel 36A, opposite the first lateral side. Both the first and second handle lateral side panels 36B, 36C extend outwardly from the topside panel 36A and extend lengthwise between a proximal end and a distal end. In the embodiment shown in FIGS. 2-4 the handle first and second lateral side panels 36B, 36C are perpendicular to the topside panel 36A and are parallel one another. Both of the first and second handle lateral side panels 36B, 36C include a pivot pin aperture disposed adjacent to the distal end of the respective handle lateral side panel 36B, 36C for receiving a handle pivot axle 58. Both of the first and second handle lateral side panels 36B, 36*c* include an drive link post aperture 60 for receiving a respective drive link post 88A, 88B. The drive link post apertures 60 are aligned with one another. Each respective drive link post aperture 60 is configured to allow travel of a respective drive link post 88A, 88B within the aforesaid drive link post aperture 60. In the embodiment shown in FIG. 4, the drive link post apertures 60 are configured as slots (e.g., having a slot length greater than its width) that extend in a straight line between a first end 60A and a second end 60B. In those embodiments wherein the drive link post apertures 60 are configured as slots, they are not required to be straight line slots; e.g., the slot may extend arcuately in the lengthwise direction between the first and second ends. The drive link post apertures 60 are disposed on a side of the handle pivot axle 58 apertures opposite the distal end of the handle 36. The present disclosure is not limited to this handle 36 configuration.

The handle latch mechanism 56 is disposed in the handle topside panel 36A and includes a lever 62 and a pair of hook latches 64 attached to the lever 62. The lever 62 and the attached hook latches 64 are pivotally mounted to the handle 36. The lever 62 and hook latches 64 may be disposed in a latched orientation wherein the lever 62 is flush with the top side panel 36A of the handle 36 and the hook latches 64 are in a latched position, and the lever 62 and hook latches 64 may be disposed in an unlatched orientation (not shown) wherein the lever 62 is pivoted away from the topside panel 36A of the handle 36 and the hook latches 64 are rotated into an unlatched position. In some embodiments, the handle latch mechanism 56 may include a biasing element (e.g., a spring 66—see FIG. 4) that biases the lever 62 in the latched orientation. The handle latch mechanism 56 described above and shown in the FIGURES is an example of a handle latch mechanism and the present disclosure is not limited thereto.

Referring to FIGS. 2 and 3, the latch pin guide block 38 includes a cylindrical body having an inner bore 68 and a pair of attachment flanges 70. The inner bore 68 extends through the cylindrical body in a lengthwise direction. The attachment flanges 70 include apertures for receiving the proximal end pin 52 extending between the first and second lateral side panels 32, 34, and apertures for receiving the fastener configured to mount the latch assembly 28. In an assembled latch assembly 28, the attachment flanges 70 are disposed between the inner surfaces 32A, 34A of the latch assembly first and second lateral side panels 32, 34 and the proximal end pin 52 extends through the attachment flanges 70.

Figure 5:
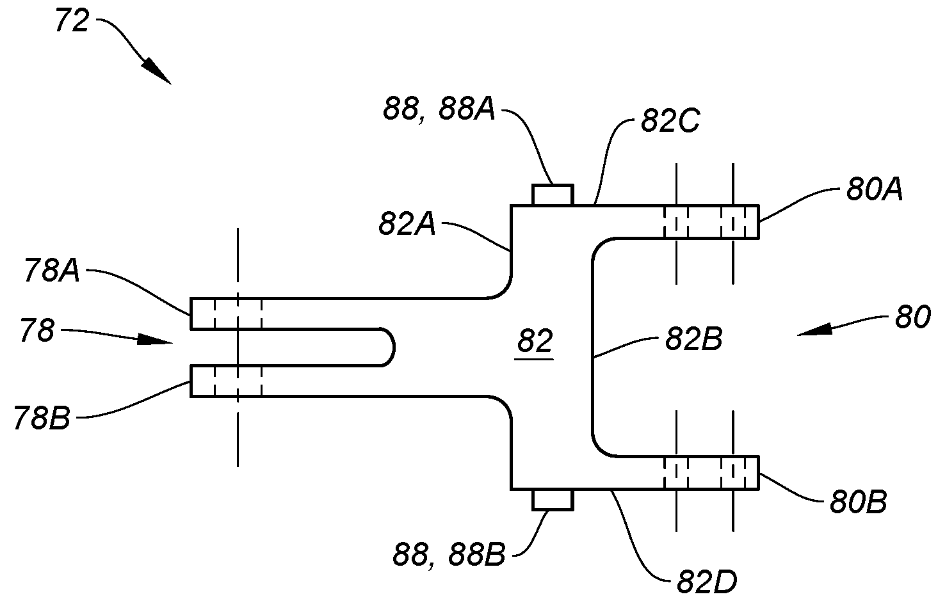
FIG. 5 is a diagrammatic planar view of a drive link embodiment.

Referring to FIGS. 4 and 5, the latch pin linkage 40 includes a drive link 72, a drag link 74, and a latch pin 76. The drive link 72 includes a drag link clevis 78, a pivot axle clevis 80, a central body 82, and at least one drive link post. The central body 82 has a first lengthwise side 82A, a second lengthwise side 82B, a first lateral side 82C, and a second lateral side 82D. The first lengthwise side 82A is opposite the second lengthwise side 82B, and the first lateral side 82C is opposite the second lateral side 82D. The first and second lengthwise sides 82A, 82B may be orthogonal to the first and second lateral sides 82C, 82D. The drag link clevis 78 extends out from the first lengthwise side 82A of the central body 82 and the pivot axle clevis 80 extends out from the second lengthwise side 82B of the central body 82. The drag link clevis 78 includes a pair of parallel flanges 78A, 78B separated from one another by a center slot. The center slot is configured to receive a portion of the drag link 74. Each drag link clevis flange 78A, 78B includes an aperture for receiving a drag link pivot axle 84 and an aperture for receiving an over-center pin 86. The drag link pivot axle 84 extends between the drag link clevis flanges 78A, 78B and through the drag link clevis center slot. The over-center pin 86 extends between the drag link clevis flanges 78A, 78B and through the drag link clevis center slot. The pivot axle clevis 80 includes a pair of parallel flanges 80A, 80B separated from one another. Each pivot axle clevis flange 80A, 80B includes an aperture for receiving the handle pivot axle 58. The drive link post embodiment shown in FIG. 6 includes a pair of drive link posts 88A, 88B; e.g., a first drive link post 88A extending out from the first lateral side 82C of the central body 82 and a second drive link post 88B extending out from the second lateral side 82D of the central body 82.

The drag link 74 extends lengthwise between a proximal end and a distal end. The proximal end of the drag link 74 is pivotally attached to a distal end of the latch pin 76. The distal end of the drag link 74 is pivotally attached to drag link clevis 78.

The latch pin 76 extends lengthwise between an engagement end 76A and a distal end 76B. The latch pin 76 embodiment shown in FIGS. 2 and 3 has a circular cross-sectional geometry, but the latch pin 76 is not limited thereto. The engagement end 76A of the latch pin 76 is configured for engagement with a mating element 90 (diagrammatically shown) located, for example in an adjacent nacelle surface. The present disclosure is not limited to use with any particular mating element 90. In some embodiments, the engagement end 76A of the latch pin 76 may be configured to facilitate engagement between the latch pin 76 and the mating element 90. For example, the engagement end 76A of the latch pin 76 shown in FIGS. 2 and 3 is tapered to facilitate engagement. The present disclosure is not limited to any particular engagement end 76A geometry.

Figure 6:
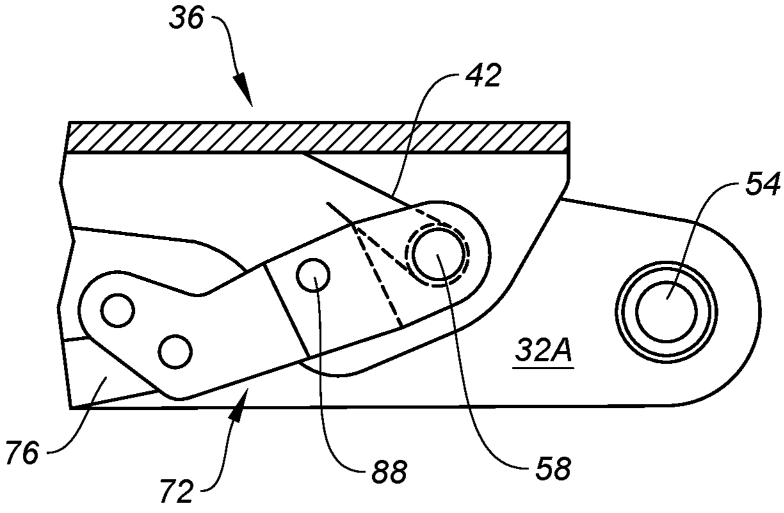
FIG. 6 is a diagrammatic partial view of a present disclosure latch assembly, showing a handle biasing element embodiment.

Referring to FIGS. 4 and 6, the handle biasing element 42 is configured to bias the handle 36 toward a handle open configuration; e.g., bias the handle 36 to rotate about the handle pivot axle 58 away from the first and second lateral side panels 32, 34. The handle biasing element 42 may include a single element (shown diagrammatically in FIG. 6) or more than one element (FIG. 4 illustrates a pair of handle biasing elements). A non-limiting example of a handle biasing element 42 is a torsion spring. The torsion spring coil may be mounted on the handle pivot axle 58 with a first leg of the torsion spring acting on the handle 36 and a second leg of the torsion spring acting on drive link 72. The present disclosure is not limited to any particular handle biasing element 42 configuration.

In the embodiment shown in FIG. 3, the latch assembly 28 includes a first hook latch post 92 attached to the inner surface 32A of the first lateral side panel 32 and a second hook latch post 94 attached to the inner surface 34A of the second lateral side panel 34. The first and second hook latch posts 92, 94 are configured for engagement with the hook latches 64 of the handle latch mechanism 56.

Figure 7A:
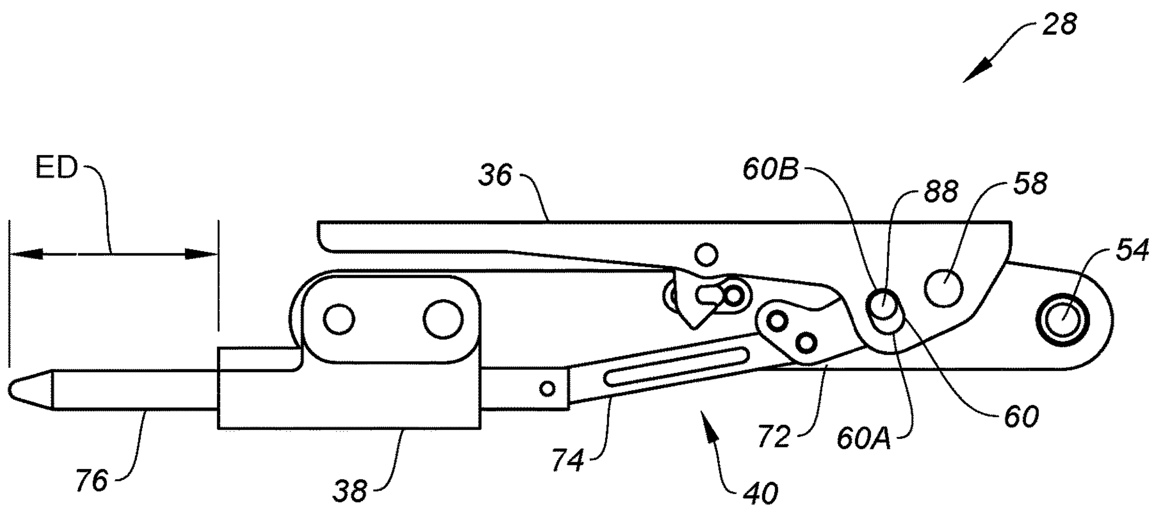
FIG. 7A is a diagrammatic perspective view of a present disclosure latch assembly embodiment shown in a handle closed configuration.
Figure 7B:
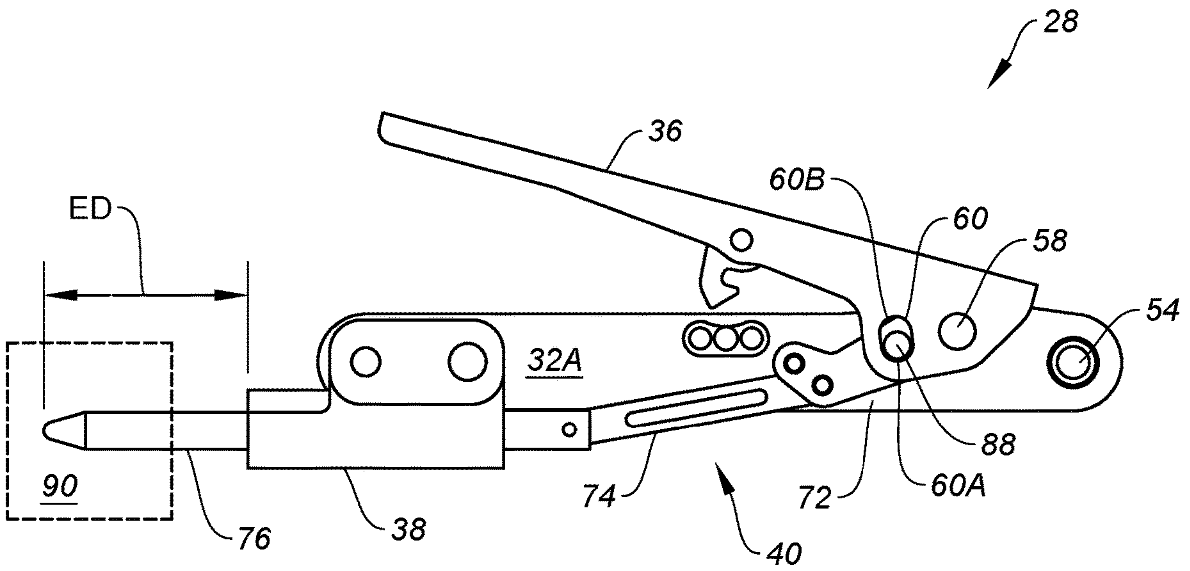
FIGS. 7B-7D are diagrammatic perspective views of a present disclosure latch assembly embodiment shown in handle open configurations, with the handle shown in different rotational positions.
Figure 7C:
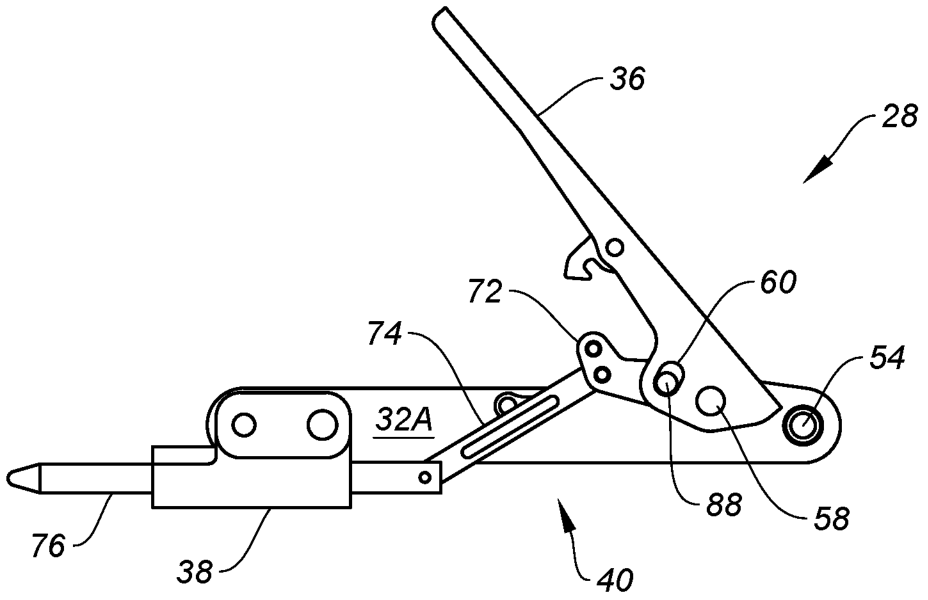
Figure 7D:
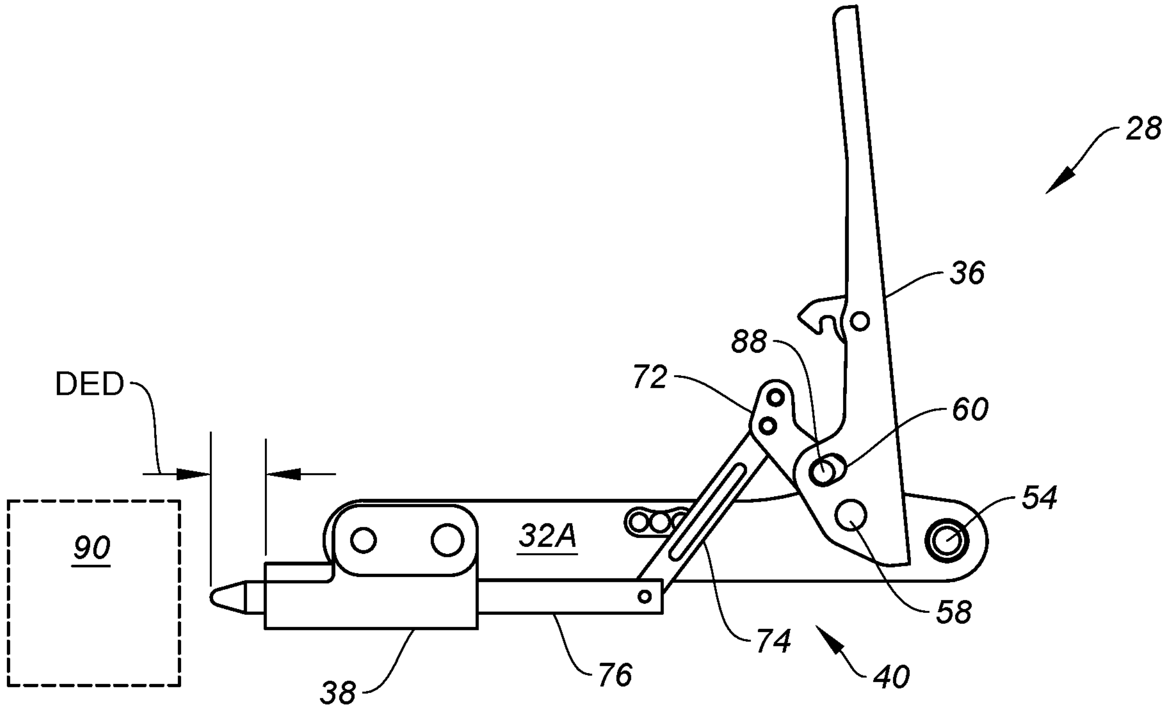

FIG. 7A diagrammatically illustrates the latch assembly 28 in a handle closed configuration and FIGS. 7B-7D diagrammatically illustrate the latch assembly 28 in a plurality of handle open configurations.

In the handle closed configuration (as shown in FIG. 7A), the handle 36 is latched to the hook latch posts 92, 94 via the hook latches 64 and the latch pin 76 is disposed in an engaged configuration. In the engaged configuration, the latch pin 76 is extended out from the latch assembly 28 an engaged distance ("ED") for engagement with a mating element 90 disposed in or attached to another nacelle element. In the handle closed configuration, each drive link post 88A, 88B is received within a respective handle drive link post aperture 60 and is disposed at one end of the handle drive link post aperture 60. In those embodiments wherein the handle drive link post aperture 60 is configured as a slot, the drive link posts 88A, 88B are disposed at the first end 60A of the slots when the latch assembly 28 is configured in the handle closed configuration, and the drive link posts 88A, 88B are disposed at the second end 60B of the slots when the latch assembly 28 is configured in a handle open configuration. In the handle closed configuration, the over-center pin 86 is disposed above the drag link 74 and limits the rotation of the drive link 72 and drag link 74; e.g., prevents further rotation of the drive link 72 and drag link 74 in a counterclockwise direction as shown in FIG. 7A.

FIG. 7B illustrates the handle 36 in a first handle open configuration. In this configuration, the handle latch assembly 28 has been actuated to release the hook latches 64 from the hook latch posts 92, 94. The handle biasing element 42 acting against the handle 36 causes the handle 36 to rotate away from the latch assembly 28 (i.e., in a clockwise direction in FIG. 7B). In the first handle open configuration, the drive link posts 88A, 88B remain received within the handle drive link post apertures 60 but are now disposed at the opposite end of the handle drive link post aperture 60 as a result of the handle 36 rotating away from the latch assembly 28. The length of post 88A, 88B travel permissible within the handle drive link apertures 60 defines the amount of handle 36 rotation as a result of the handle biasing element 42; i.e., "biased handle travel". The amount of biased handle travel may be selected to ensure an operator can easily grasp the handle 36 in the first handle open configuration. In the first handle open configuration, the latch pin linkage 40 (e.g., the latch pin 76) has not moved laterally from the engaged position; i.e., the latch pin 76 remains at the ED distance.

FIG. 7C illustrates the handle 36 in a second handle open configuration and FIG. 7D illustrates the handle 36 in a third handle open configuration (i.e., the handle fully open configuration). In these open configurations, the handle biasing element 42 continues to act against the handle 36 but does not cause the handle 36 to rotate. Rotation from the first handle open configuration to the second or third handle open configurations is accomplished by an operator rotating the handle 36; e.g., in a clockwise direction as shown in FIGS. 7C and 7D.

Referring to FIG. 7C, rotation of the handle 36 engages the drive link posts 88A, 88B and thereby causes the drive link 72 to rotate; e.g., in a clockwise direction as shown in FIG. 7C. The rotation of the drive link 72, in turn, translates the drag link 74 upward and toward the distal end 46 of the latch assembly 28. During the translation, the drag link 74 pivots relative to the drive link 72 and pivots relative to the latch pin 76. The translation of the drag link 74 causes linear translation of the latch pin 76; i.e., the latch pin 76 retracts and now extends out from the latch assembly 28 a distance less than the engaged distance ("ED").

Referring to FIG. 7D, further rotation of the handle 36 causes the drive link posts 88A, 88B to rotate the drive link 72 further; e.g., in a clockwise direction as shown in FIG. 7D. FIG. 7D shows the handle 36 in a handle fully open configuration. The rotation of the drive link 72, in turn, translates the drag link 74 upward and toward the distal end 46 of the latch assembly 28. During the translation, the drag link 74 pivots relative to the drive link 72 and pivots relative to the latch pin 76. The translation of the drag link 74 causes linear translation of the latch pin 76; i.e., the latch pin 76 retracts and now extends out from the latch assembly 28 a disengaged distance ("DED"). When the latch pin 76 extends out from the latch assembly 28 the disengaged distance ("DED"), the latch pin 76 is no longer engaged with the mating element 90 (shown diagrammatically) and the fan cowl (or other structure to which the latch assembly 28 is in communication) is now free to be opened. In the third handle open configuration (i.e., the handle fully open configuration), the drive link 72 and the drag link 74 may be configured such that the drive link 72 engages with the drag link 74 to prevent further rotation of the latch assembly 28 components; i.e., prevent further rotation of the latch assembly 28 component in a clockwise direction as shown in FIG. 7D.

To close and latch the fan cowl (or other structure to which the latch assembly 28 is in communication), the opposite process is performed. The fan cowl is rotated into a closed position and the latch assembly 28 handle 36 is rotated towards the latch assembly 28; i.e., the counterclockwise direction as shown in FIGS. 7A-7D. Once the latch pin 76 is translated into engagement with the mating element 90, the fan cowl is latched. The handle 36 can be returned to the handle closed configuration (as shown in FIG. 7A) by pushing the handle 36 towards the latch assembly 28 until the hook latches 64 are engaged with the hook latch posts 88A, 88B.

The terms "substantially", "generally" and/or "about" as contemplated herein are used with the appreciation that small variations in dimensions are within the present disclosure. Such small variations can include variations due to manufacturing tolerances and/or expansion/contraction of parts subjected to varying conditions (e.g., pressure, force, temperature, etc.).

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A latch assembly, comprising:

a first lateral side panel and a second lateral side panel, wherein the first lateral side panel and the second lateral side panel extend lengthwise between a proximal end of the latch assembly and a distal end of the latch assembly;

a handle pivotally attached to the first lateral side panel and the second lateral side panel for rotation about a handle pivot axle, the handle including a first drive link post aperture and a second drive link post aperture, the first drive link post aperture and the second drive link post aperture are aligned with one another;

a latch pin linkage that includes a drive link, a drag link, and a latch pin;

the drive link has a central body with a first lengthwise side and a second lengthwise side, wherein the first lengthwise side is opposite the second lengthwise side, and a first lateral side and a second lateral side, wherein the first lateral side is opposite the second lateral side, and the first lengthwise side and the second lengthwise side are orthogonal to the first lateral side and the second lateral side, the drive link further including a drag link clevis extending out from the first lengthwise side of the central body, a pivot axle clevis extending out from the second lengthwise side of the central body, the pivot axle clevis rotatably connected to the handle pivot axle, a first drive link post extending out from the central body first lateral side and a second drive link post extending out from the central body second lateral side, wherein the first drive link post is received within the first drive link post aperture and the second drive link post is received within the second drive link post aperture;

wherein the drag link (DL) has a DL proximal end and a DL distal end, and the DL distal end is pivotally attached to the drag link clevis and the DL proximal end is pivotally attached to the latch pin;

a latch pin guide block disposed between the first lateral side panel and the second lateral side panel at the proximal end of the latch assembly, the latch pin guide block having an inner bore configured to receive the latch pin; and a handle biasing element configured to bias the handle to rotate about the handle pivot axle away from the first lateral side panel and the second lateral side panel.

2. The latch assembly of claim 1, wherein the latch assembly is configured for the handle to rotate between a handle closed configuration and a handle fully open configuration;

wherein the drive link is configured to stop rotation of the latch pin linkage in a first rotational direction beyond the handle closed configuration and to stop rotation of the latch pin linkage in a second rotational direction beyond the handle fully open configuration, wherein the first rotational direction is opposite the second rotational direction.

3. The latch assembly of claim 2, wherein the drive link includes an over-center pin engaged with the drag link clevis and the over-center pin is disposed to contact the drag link to stop the rotation of the latch pin linkage in the first rotational direction beyond the handle closed configuration.

4. The latch assembly of claim 2, wherein the drive link is configured to contact the drag link to stop the rotation of the latch pin linkage in the second rotational direction beyond the handle fully open configuration.

5. The latch assembly of claim 1, wherein the handle includes a topside panel, a first handle lateral side panel, and a second handle lateral side panel, wherein the first handle lateral side panel and the second handle lateral side panel extend outwardly from the topside panel such that the first handle lateral side panel, the second handle lateral side panel, and the topside panel collectively forming a U-shape;

wherein the first drive link post aperture is disposed in the first handle lateral side panel, and the second drive link post aperture is disposed in the second handle lateral side panel.

6. The latch assembly of claim 5, wherein the first drive link post aperture is configured as a first drive link post slot, and the second drive link post aperture is configured as a second drive link post slot; and wherein the first drive link post slot and the second drive link post slot each have a slot length that is greater than a slot width, and the slot length extends between a slot first end and a slot second end.

7. The latch assembly of claim 6, wherein each slot length extends along a straight line.

8. The latch assembly of claim 6, wherein the latch assembly is configured to rotate between a handle closed configuration and a plurality of handle open configurations; and wherein in the handle closed configuration the first drive link post is disposed at the first slot end of the first drive link post slot, and the second drive link post is disposed at the first slot end of the second drive link post slot; and wherein in the plurality of handle open configurations, the first drive link post is disposed at the second slot end of the first drive link post slot, and the second drive link post is disposed at the second slot end of the second drive link post slot.

9. The latch assembly of claim 1, wherein the latch pin guide block includes a pair of attachment flanges; and wherein the latch assembly further includes a proximal end pin that is engaged with the first lateral side panel and the second lateral side panel, and the proximal end pin extends through the attachment flanges.

10. The latch assembly of claim 9, wherein the latch pin guide block attachment flanges, the first lateral side panel, and the second lateral side panel include aligned fastener apertures configured to receive a latch assembly mounting fastener, the fastener apertures disposed between the distal end of the latch assembly and the proximal end pin.

11. The latch assembly of claim 1, wherein the handle biasing element is configured to act against the handle and to act against the drive link.

12. The latch assembly of claim 11, wherein the handle biasing element is a torsional spring.

13. The latch assembly of claim 1, wherein the handle includes a handle latch mechanism configured to bias the handle latch mechanism in a latched orientation.

14. A latch assembly, comprising:

a first lateral side panel and a second lateral side panel, wherein the first lateral side panel and the second lateral side panel extend lengthwise between a proximal end of the latch assembly and a distal end of the latch assembly;

a handle pivotally attached to the first lateral side panel and the second lateral side panel for rotation about a handle pivot axle, and the handle is rotatable between a handle closed configuration and a handle fully open configuration, the handle comprising a first drive link post aperture and a second drive link post aperture, wherein the first drive link post aperture and the second drive link post aperture are aligned with one another;

a latch pin linkage that includes a drive link, a drag link, and a latch pin;

wherein the drive link comprises a central body having a first lateral side and a second lateral side opposite the first lateral side, the drive link further comprising a first drive link post extending out from the first lateral side, and a second drive link post extending out from the second lateral side, wherein the first drive link post is received within the first drive link post aperture and the second drive link post is received within the second drive link post aperture;

wherein the drive link is configured to stop rotation of the latch pin linkage in a first rotational direction beyond the handle closed configuration and to stop rotation of the latch pin linkage in a second rotational direction beyond the handle fully open configuration, wherein the first rotational direction is opposite the second rotational direction;

wherein the drag link is pivotally attached to the drive link and pivotally attached to the latch pin; and a latch pin guide block disposed between the first lateral side panel and the second lateral side panel at the proximal end of the latch assembly, the latch pin guide block having an inner bore configured to receive the latch pin.

15. The latch assembly of claim 14, further comprising a handle biasing element configured to bias the handle to rotate about the handle pivot axle away from the first lateral side panel and the second lateral side panel.

16. The latch assembly of claim 14, wherein:

the central body has a first lengthwise side and a second lengthwise side, wherein the first lengthwise side is opposite the second lengthwise side, and the first lengthwise side and the second lengthwise side are orthogonal to the first lateral side and the second lateral side; and the drive link further comprises:

a drag link clevis extending out from the first lengthwise side of the central body; and a pivot axle clevis extending out from the second lengthwise side of the central body, the pivot axle clevis rotatably connected to the handle pivot axle.

17. The latch assembly of claim 14, wherein the first drive link post aperture is configured as a first drive link post slot, and the second drive link post aperture is configured as a second drive link post slot; and wherein the first drive link post slot and the second drive link post slot each have a slot length that is greater than a slot width, and the slot length extends between a slot first end and a slot second end.

18. The latch assembly of claim 17, wherein each slot length extends along a straight line.

19. The latch assembly of claim 17, wherein in the handle closed configuration the first drive link post is disposed at the first slot end of the first drive link post slot, and the second drive link post is disposed at the first slot end of the second drive link post slot; and wherein in the handle fully open configuration, the first drive link post is disposed at the second slot end of the first drive link post slot, and the second drive link post is disposed at the second slot end of the second drive link post slot.

* * * * *